(12) United States Patent  (10) Patent No.: US 7,424,944 B2
Mustalahti et al.  (45) Date of Patent: Sep. 16, 2008

(54) TRAVELATOR AND BELT PULLEY (75) Inventors: Jorma Mustalahti, Hyvinkää (FI); Esko Aulanko, Kerava (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 11/631,691

(22) PCT Filed: Jul. 5, 2005

(86) PCT No.: PCT/FI2005/000316

§ 371 (c)(1),
(2), (4) Date: Jan. 5, 2007

(87) PCT Pub. No.: WO2006/003247

PCT Pub. Date: Jan. 12, 2006

(65) Prior Publication Data

US 2007/0227860 A1  Oct. 4, 2007

(30) Foreign Application Priority Data

Jul. 5, 2004 (FI) ................................ 20040939

(51) Int. Cl.
B66B 21/00 (2006.01)
(52) U.S. Cl. ...................... 198/321; 198/834
(58) Field of Classification Search ................ 198/321, 198/325, 330, 781.09, 781.1, 790, 834, 835
See application file for complete search history.

(56) References Cited

U.S. PATENT DOCUMENTS

| 464,795 | A | | 12/1891 | Dodge |
| 1,689,201 | A | | 10/1928 | Halter |
| 2,769,522 | A | | 11/1956 | Pfeiffer |
| 3,592,139 | A | | 7/1971 | Patin |
| 3,665,863 | A | * | 5/1972 | Patin .......................... 198/321 |
| 4,289,227 | A | * | 9/1981 | Matsui et al. ............... 198/334 |

FOREIGN PATENT DOCUMENTS

| DE | 805 584 | 5/1951 |
| DE | 864487 | 1/1953 |
| DE | 28 04 549 | 8/1979 |
| GB | 2077387 | 12/1981 |
| JP | 2003-20181 | 1/2003 |
| WO | WO/2005/051829 | 6/2005 |

* cited by examiner

*Primary Examiner*—James R Bidwell
(74) *Attorney, Agent, or Firm*—Venable LLP; Robert Kinberg; Steven J. Schwarz (57) ABSTRACT

A conveyor for use in a travelator for transporting passengers in a transport direction. The conveyor comprises a frame; a plurality of shafts mounted on the frame substantially transversely to the transport direction, each of the plurality of shafts being substantially parallel to one another and spaced apart from one another. A belt pulley pack is mounted on each of the shafts, each belt pulley pack comprising a plurality of belt pulleys mounted adjacent to one another. Each belt pulley comprises a mold-cast object comprising: a first side having a first aligning and coupling element formed therein; a second side opposite to the first side, the second side having a second aligning and coupling element fitted to match the first aligning and coupling element, so that the first and second aligning and coupling elements of adjacent belt pulleys align and couple the adjacent belt pulleys together in a shape-locking manner. A moving transport surface comprises a plurality of mutually parallel endless belt loops, each of the belt loops passing over two belt pulleys located on different shafts.

11 Claims, 7 Drawing Sheets

TRAVELATOR AND BELT PULLEY

CROSS-REFERENCE TO RELATED APPLICATIONS

This application is the National Stage of International Application No. PCT/FI2005/000316, filed Jul. 5, 2005, which claims the priority benefit of Application No. FI20040939, filed in Finland on Jul. 5, 2004.

BACKGROUND

1. Technical Field

The present invention relates to a travelator for conveying passengers. More particularly, the invention relates to a belt pulley for use in such a travelator.

2. Related Art

The following patent documents disclose travelators intended for transporting people: Japanese patent document JP 2003-20181, U.S. Pat. No. 1,689,201, U.S. Pat. No. 2,769,522 and U.S. Pat. No. 3,592,139. In these patent documents, the conveyor includes a large number of adjacent narrow belt loops, several such belt loops being arranged over the width of the conveyor to transport users of the travelator. The conveyor has a large number of shafts mounted with bearings on the conveyor frame and arranged to be parallel to each other, at a distance from each other and transverse to the transport direction of the conveyor. Coupled to each shaft are a number of belt pulleys placed side by side.

Further, the conveyor comprises a number of mutually parallel endless belt loops, which form the moving conveying surface of the conveyor. The mutual arrangement of the belt loops is so implemented that they are interlaced with respect to each other in a comb-like fashion around each shaft. Each belt loop is passed over two belt pulleys on two successive shafts. Of each two closely adjacent belt loops on the same common shaft that are passed over adjacent belt pulleys, one belt loop is passed over a belt pulley on the previous shaft adjacent to the common shaft while the other belt loop adjacent to the aforesaid belt loop is passed over a belt pulley on the next shaft adjacent to the aforesaid common shaft.

The belts have a width of e.g. about 5 to 8 mm, preferably 6 mm, and thus, if the travelator has a width of e.g. 1 m, the number of parallel belt pulleys arranged on one shaft is large, e.g., 100 to 200 pulleys. Producing such a belt pulley combination, especially as a single component, can be very difficult even in a case where the belt pulleys on the same shaft are identical to each other and have the same diameters/numbers of teeth. It can be more difficult to produce a combination of a shaft and a set of belt pulleys with adjacent belt pulleys having different diameters/numbers of teeth in a manner advantageous with respect to economy and manufacturing technology. Pulley combinations of the afore-mentioned type are sometimes needed in high-speed travelators designed to achieve a transport speed (on the order of 5 m/s) substantially higher than the conventional transport speed (0.6 to 0.8 m/s). Therefore an acceleration section, a constant speed section, and a deceleration section are often required. In the acceleration and deceleration sections, adjacent toothed belt pulleys on the same shaft have different diameters/numbers of teeth. A further problem sometimes encountered with traditional solutions is poor dimensional accuracy and poor strength.

SUMMARY

An object of the invention is to overcome the above-mentioned drawbacks.

Another object of the invention is to disclose a travelator in which the combination of a shaft and a set of belt pulleys mounted on it is easy to manufacture, accurately dimensioned, and advantageous with respect to economy and manufacturing technology.

Embodiments are presented in the following description and drawings of the present application. The inventive content disclosed in the application can also be defined in other ways than is done in the claims below. The inventive content may also include several separate inventions, especially if the invention is considered in the light of explicit or implicit sub-tasks or in respect of advantages or sets of advantages achieved. In this case, some of the attributes contained in the claims below may be superfluous from the point of view of separate inventive concepts. Within the framework of the basic concept of the invention, features of different embodiments of the invention can be applied in conjunction with other embodiments.

According to one embodiment of the invention, the belt pulley is a mold-cast object. Such an object preferably comprises one solid material. The object comprises a first side, in which is formed a first aligning and coupling element, and a second side opposite to the first side, in which is formed a second aligning and coupling element fitted to match the first aligning and coupling element. As a result, the first and second aligning and coupling elements of adjacent belt pulleys on the shaft align and couple the belt pulleys together in shape-locking manner to form a belt pulley pack.

This embodiment of the invention has the advantage that the structure is easy to manufacture, economical, and accurately dimensioned, and allows a shaft of great flexural strength to be formed from it. The shaft is preferably a steel shaft, with suitable dimensioning.

In another embodiment of the travelator and belt pulley, the first aligning and coupling element comprises a projection, preferably a number of projections. The second aligning and coupling elements comprise openings or recesses fitted to receive the projections into them with a close fit. The projections and the edges of the opening or recess are preferably conical in the axial direction, which may also be necessary with respect to manufacturing techniques to allow release from the mold. Such shape-locking aligning and coupling elements also work well as torque-transmitting elements.

In another embodiment of the travelator and belt pulley, the belt pulleys and/or the belt pulley pack is non-rotatably mounted on the shaft in shape-locking manner, such as via a wedge coupling, and/or glue coupling, and/or frictional coupling. Fixed coupling may be necessary at least on the driving shaft.

In another embodiment of the travelator and belt pulley, the belt loops are toothed belts. Correspondingly, the belt pulleys are toothed belt pulleys, which have a toothed rim fitted to be in driving engagement with the toothed belt.

In another embodiment of the travelator and belt pulley, the travelator comprises shafts each having a belt pulley pack mounted thereon. The belt pulley pack comprises a number of first belt pulleys having a first diameter/number of teeth. In addition, mounted on the same shaft are a number of second belt pulleys having a second diameter/number of teeth, which is different (larger or smaller) in relation to the first diameter/number of teeth. The first belt pulleys and the second belt pulleys are arranged in the belt pulley pack in an alternate fashion, such that adjacent to each first belt pulley is a second belt pulley. Such shafts are provided in the acceleration and deceleration sections of the travelator.

In another embodiment of the travelator and belt pulley, the travelator comprises a shaft on which is mounted a belt pulley pack in which all the belt pulleys have the same diameter/number of teeth. Such shafts are provided in the constant-speed section.

In another embodiment of the travelator and belt pulley, the travelator comprises a shaft on which is arranged a belt pulley pack comprising third belt pulleys, each of which has on one side of the toothed rim a first guide flange of one solid structure integrated in the same object, so that the toothed rim of each belt pulley in the belt pulley pack has on either side of it a first guide flange to provide lateral support to the belt loop. As such a component has to be cast using a two-part mold, the structure must be designed taking into account a possibility to remove the injection-molded or pressure-molded object from the mold half. Therefore, according to this embodiment, the belt pulley can have a maximum of one guide flange.

In another embodiment of the travelator and belt pulley, the travelator comprises a shaft on which is arranged a belt pulley pack comprising fourth belt pulleys, in which the toothed rim is open towards both opposite sides, and in which a second guide flange is a separate piece with respect to the fourth belt pulley and is mounted between adjacent fourth belt pulleys to provide lateral support to the belt loop.

In another embodiment of the travelator and belt pulley, the travelator comprises a shaft on which is arranged a belt pulley pack comprising fifth belt pulleys, which have two toothed rims of one solid structure integrated in the same object, both toothed rims being open towards opposite sides, and a fourth guide flange placed between the toothed rims. The belt pulley pack comprises a fourth guide flange, which is a separate piece with respect to the fifth belt pulley and is mounted between adjacent fifth belt pulleys to provide lateral support to the belt loop. In this embodiment, too, the structure of the belt pulley is so designed as to allow easy release from a two-part mold.

In another embodiment of the travelator and belt pulley, the shaft includes a stopper element, against which the first end of the belt pulley pack is axially supported, and at the second end of the belt pulley pack the shaft includes tightening means, such as a nut which is screwed onto a thread located on the shaft, for pressing the belt pulley pack axially tightly against the stopper element.

In another embodiment of the travelator and belt pulley, the belt pulley is injection-molded from plastic.

In another embodiment of the travelator and belt pulley, the belt pulley is made of cast metal, preferably pressure-cast aluminum.

BRIEF DESCRIPTION OF THE DRAWINGS

Aspects of the invention will now be described by way of example only with reference to the accompanying drawings, in which.

DETAILED DESCRIPTION

Figure 1:
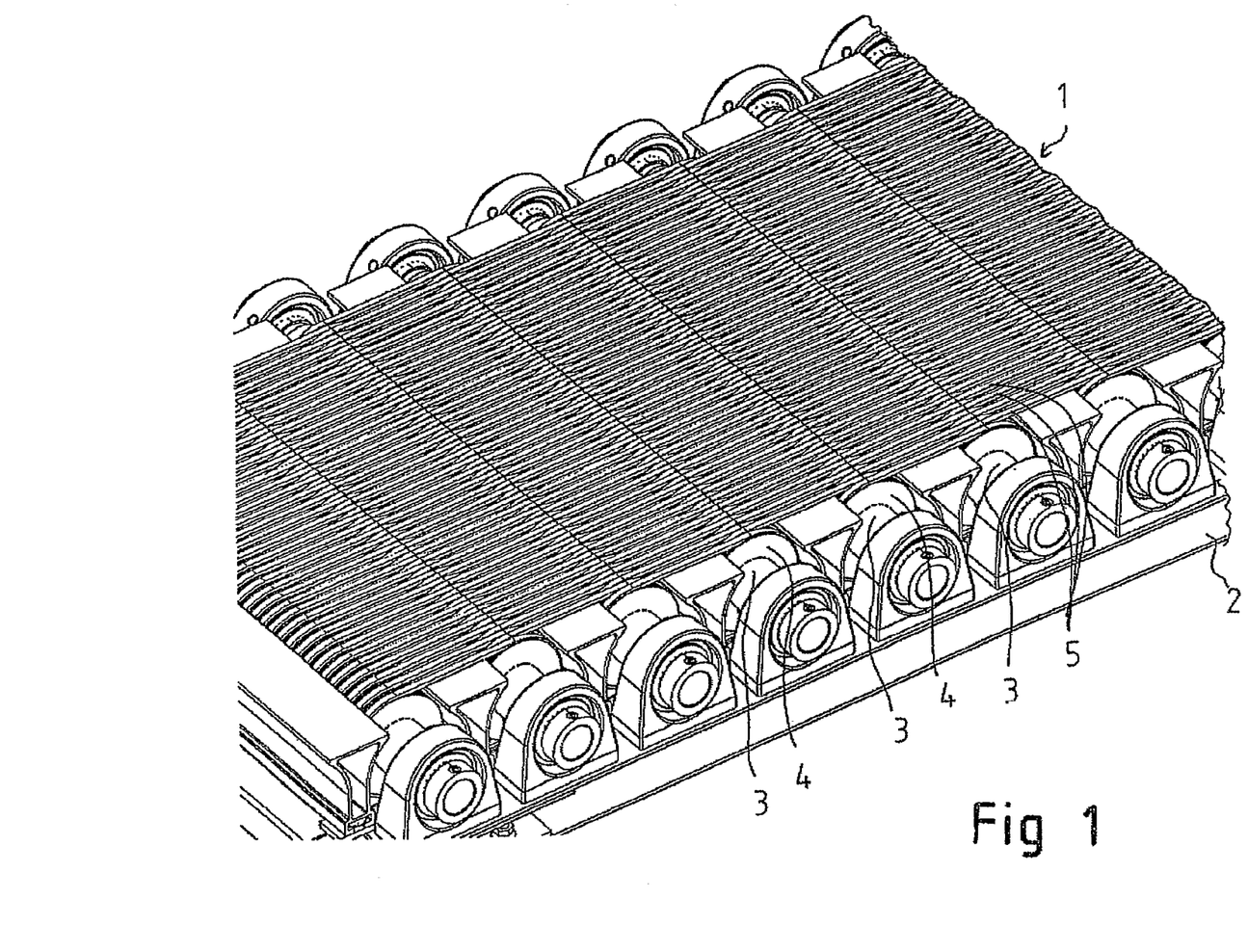
FIG. 1 depicts a perspective view of part of an embodiment of the conveyor of the travelator of the invention, seen obliquely from above.

FIG. 1 depicts a travelator comprising a conveyor 1 for transporting passengers. The conveyor 1 comprises a frame 2. Mounted with bearings on the frame 2 are a number of shafts 3 so that they are parallel to each other, at a distance from each other and transverse to the transport direction of the conveyor 1. Coupled side by side on the shaft 3 are a number of belt pulleys 4. A number of mutually parallel endless toothed belt loops 5 form the moving transporting surface of the conveyor 1. Each belt loop 5 is passed over two toothed belt pulleys on two different shafts.

As shown in FIGS. 2-6, each belt pulley 4 comprises a mold-cast object of one solid material, e.g. an object injection-molded from plastic or pressure-molded from metal.

Figure 2:
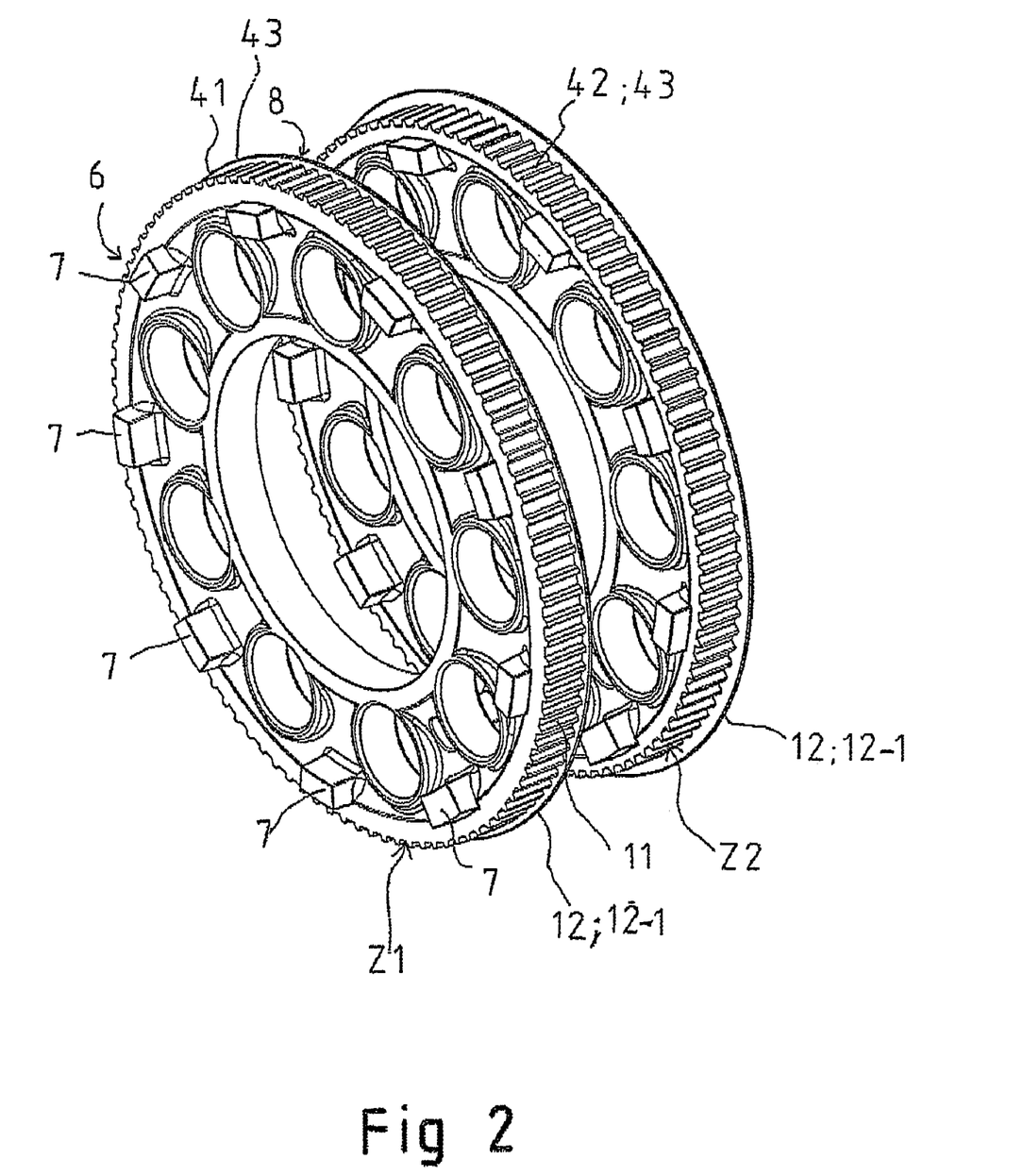
FIG. 2 depicts a perspective view of two different belt pulleys to be coupled together, a first and a second belt pulley, as seen from one side, the belt pulleys having different numbers of teeth and a guide flange integrated on one side of the toothed rim.
Figure 3:
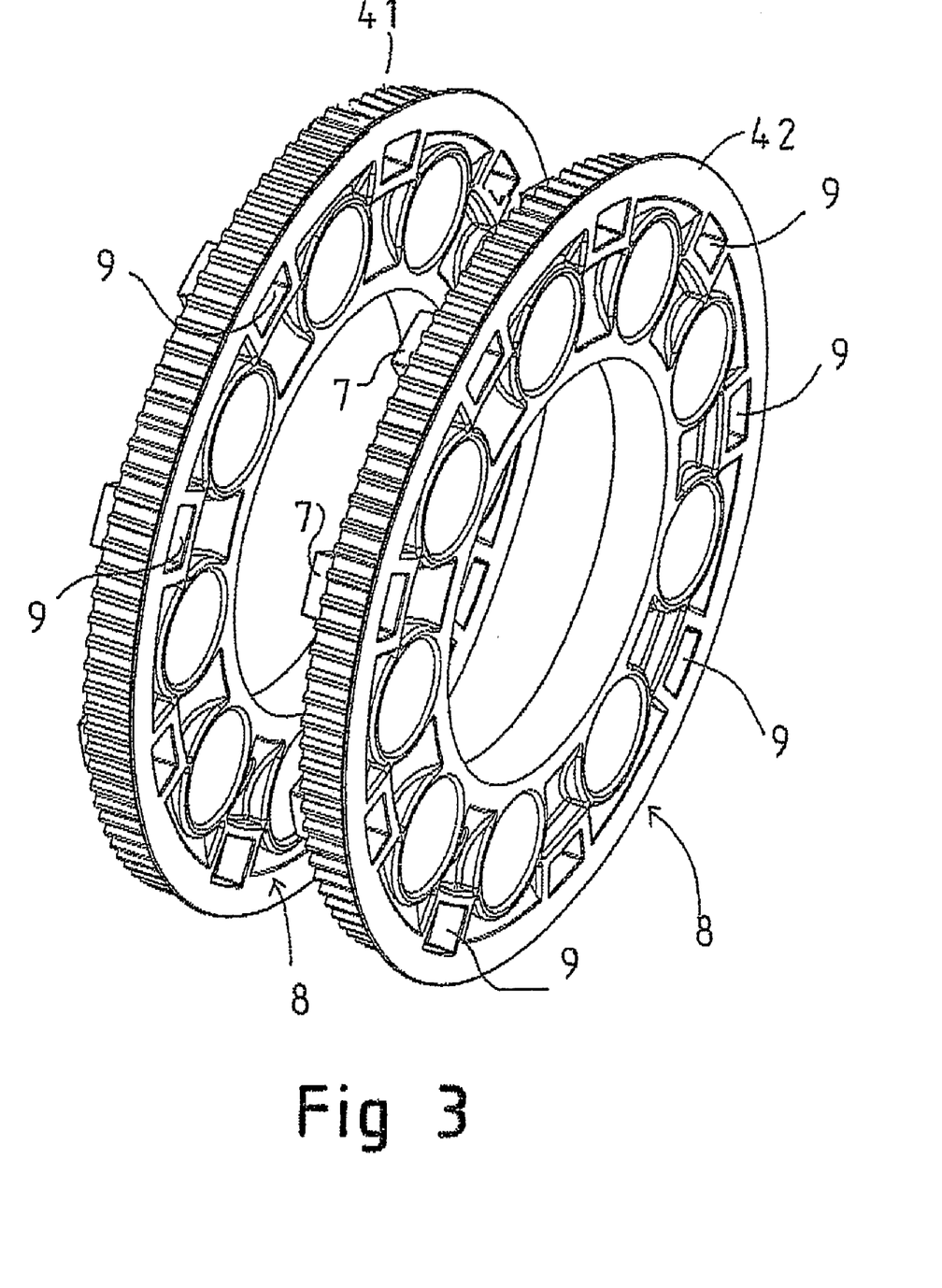
FIG. 3 depicts the belt pulleys of FIG. 2 as seen from the other side.
Figure 4:
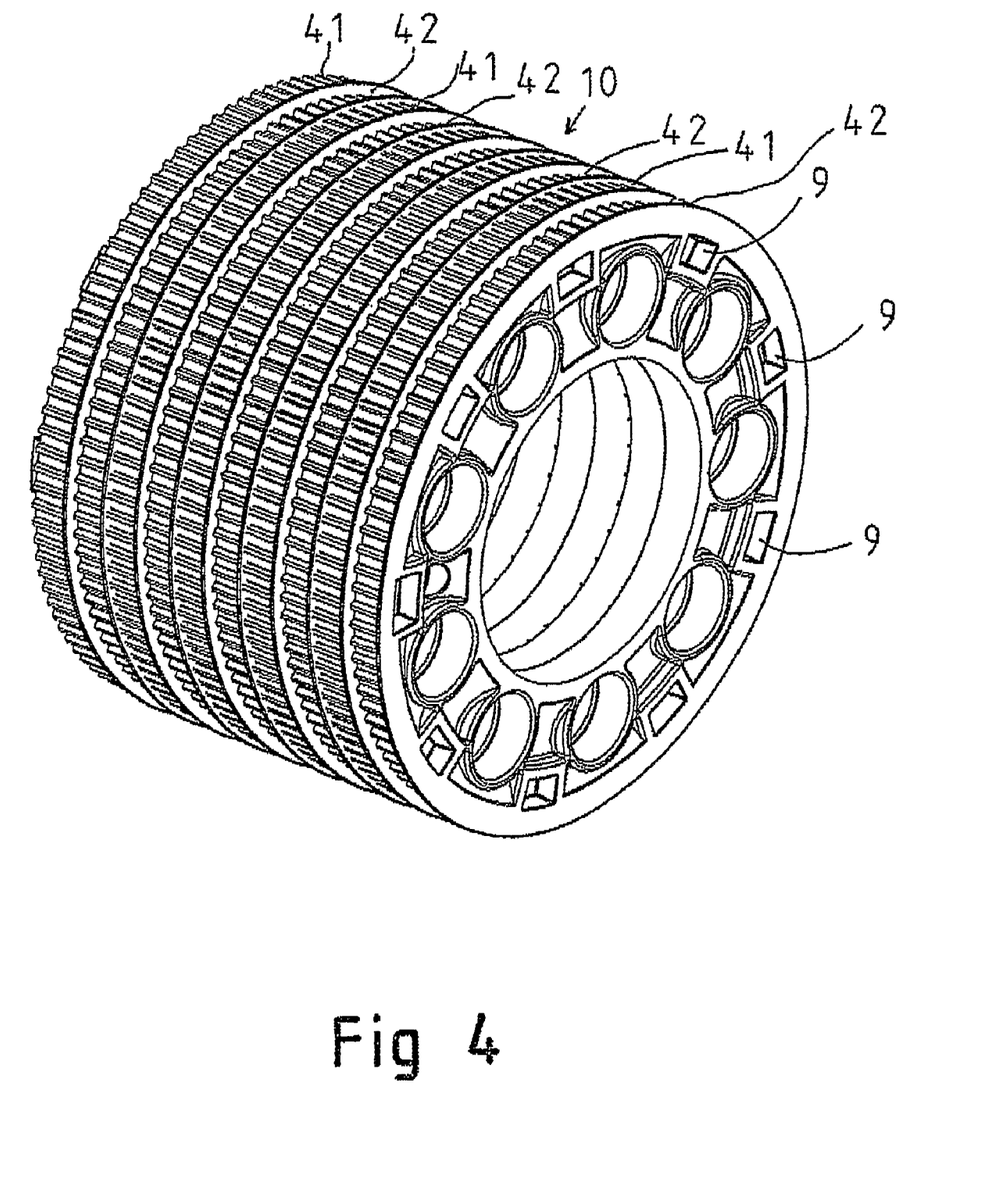
FIG. 4 depicts a perspective view of part of an embodiment of a belt pulley pack.
Figure 5:
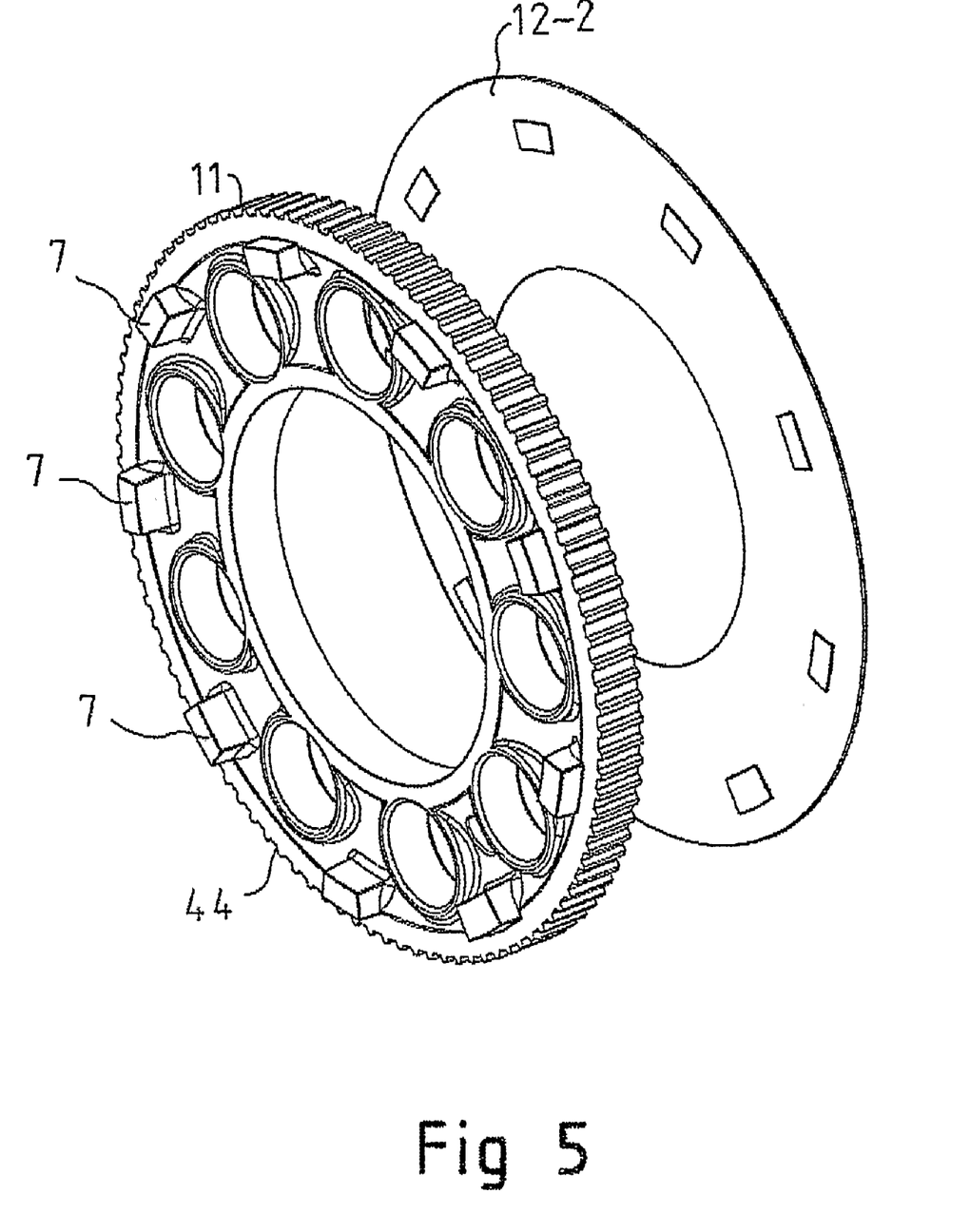
FIG. 5 depicts a perspective view of an embodiment of a belt pulley which is open towards both sides, and a separate guide flange.

Referring to FIGS. 2 and 3, this belt pulley component comprises a first side 6 with a first aligning and coupling element 7 formed on it, and a second side 8 opposite to the first side 6 with a second aligning and coupling element 9 formed on it and fitted to match the first aligning and coupling element. The first and second aligning and coupling elements of adjacent belt pulleys 4 on the shaft 3 cooperate so as to align and couple the belt pulleys to each other in shape-locking manner to form a belt pulley pack 10, a part of which is shown in FIG. 4. The individual belt pulleys 4 and/or the belt pulley pack 10 are/is non-rotatably mounted on the shaft 3 in shape-locking manner, such as via a wedge coupling, and/or glue coupling, and/or frictional coupling.

As can be seen from FIG. 2, the first aligning and coupling element 7 on the first side 6 of the belt pulley 4 comprises a projection 7, the pulley preferably including several such projections as shown in FIGS. 2 and 3.

As shown in FIG. 3, the second aligning and coupling element 9 on the second side 8 of the belt pulley comprises a number of openings or recesses 9 corresponding to the number of projections and fitted to receive the projections 7 into them with a close fit. The projections and recesses together may also form e.g. a snap-on coupling.

FIG. 2 shows in the foreground a first belt pulley 41, which has a first diameter D1/number of teeth Z1. Behind it is shown a second belt pulley 42, which has a second diameter D2/number of teeth Z2, which is smaller than the first diameter D1/number of teeth Z1.

In FIG. 4, first belt pulleys 41 and second belt pulleys 42 are arranged in a belt pulley pack 10 in an alternate fashion such that adjacent to each first belt pulley 41 is a second belt pulley 42.

The belt pulley pack 10 may alternatively contain exclusively belt pulleys 4 each having the same diameter D and number of teeth Z.

FIG. 2 depicts an example of belt pulleys 43 having on one side of the toothed rim 11 a first guide flange 12-1 of one solid structure integrated in the same component. When such pulleys are placed one after the other to compose a belt pulley pack, the toothed rim 11 of each belt pulley can have on either side of it a first guide flange 12-1 to provide lateral support to the belt loop 5. The function of the guide flanges 12 is to support the belt loop 5 in the sideways direction.

FIG. 5 again depicts a belt pulley 44 in which the toothed rim 11 is open towards the opposite sides. In this case, a separate guide flange 12-2, which may be made of e.g. sheet steel, has to be mounted between each such belt pulley 44. The guide flange can be fastened to the belt pulley in shape-locking manner or e.g. by gluing.

Figure 6:
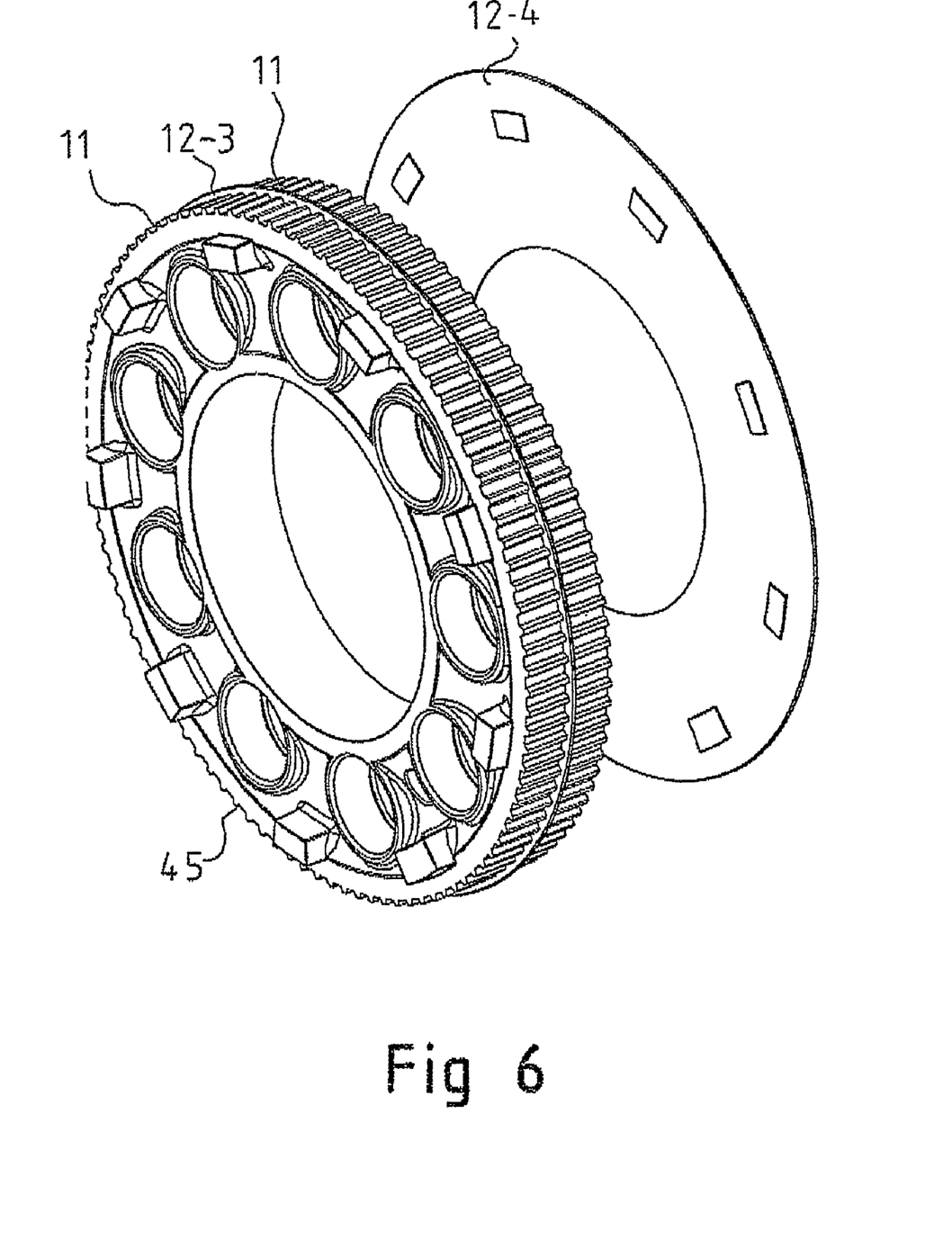
FIG. 6 depicts a perspective view of another embodiment of belt pulley having two toothed rims separated from each other by a guide flange, and a separate guide flange.

FIG. 6 depicts a belt pulley 45 having two toothed rims 11 of one solid structure integrated in the same component, each toothed rim being open towards the opposite sides. Between the toothed rims 11, integrated in the same component, is a third guide flange 12-3. In this case, a separate third guide flange 12-3, which may be of a kind corresponding to the above-mentioned second guide flange 12-2, has to be mounted between each such belt pulley 44.

Figure 7:
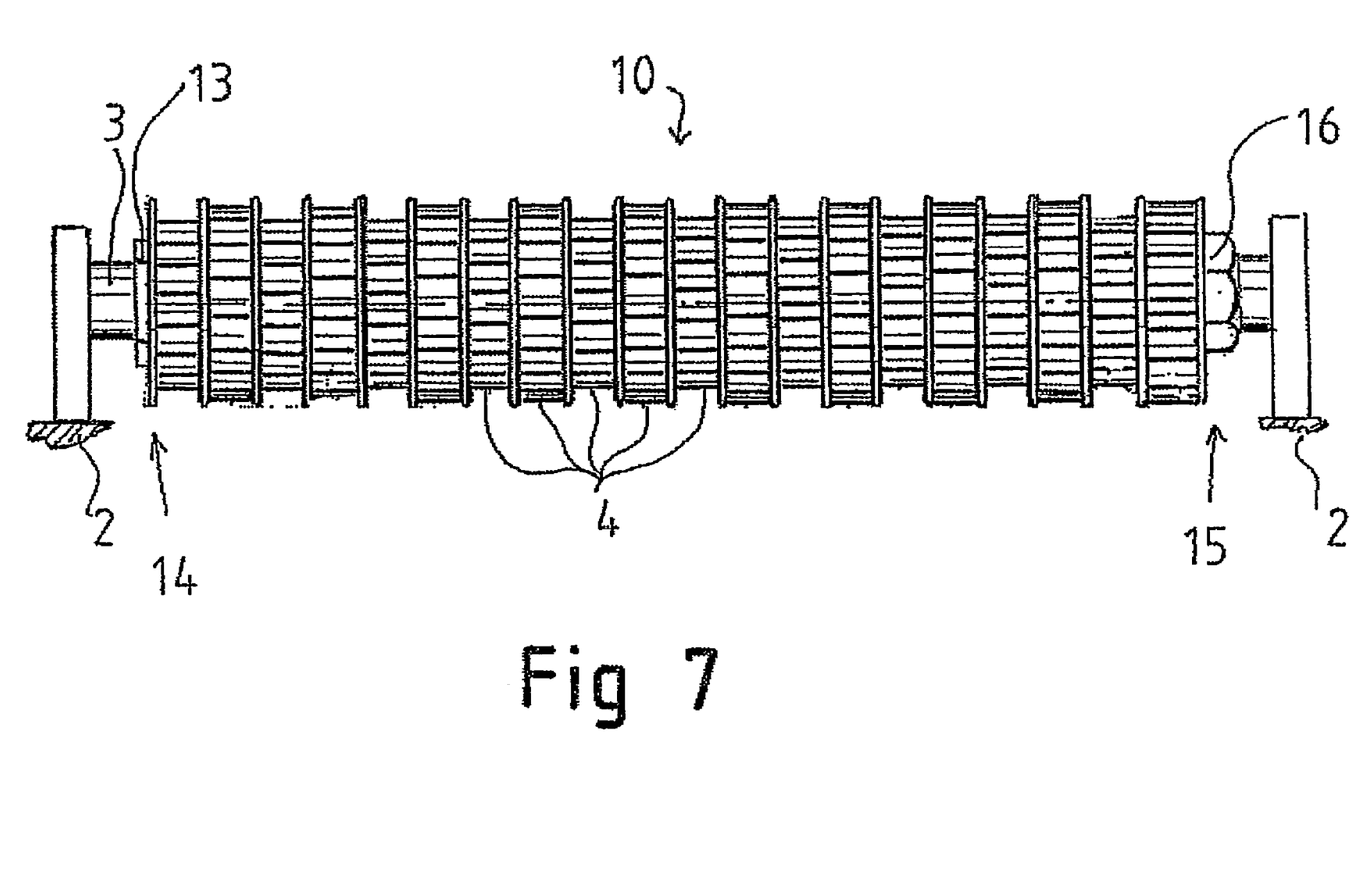
FIG. 7 depicts a diagrammatic side view of a belt pulley pack mounted on a shaft.

FIG. 7 shows that the shaft is provided with a stopper element 13, against which the first end 14 of the belt pulley pack 10 is axially supported. In the region of the second end 15 of the belt pulley pack 10, the shaft 3 is provided with tightening means 16, such as a nut which is screwed onto a thread located on the shaft, for pressing the belt pulley pack 10 axially tightly against the stopper element 13.

The invention is not limited to the embodiments described above; instead, many variations are possible within the scope of the inventive concept defined in the claims.

The invention claimed is:

1. A conveyor for use in a travelator for transporting passengers in a transport direction, the conveyor comprising:
   a frame;
   a plurality of shafts mounted on the frame substantially transversely to the transport direction, each of the plurality of shafts being substantially parallel to one another and spaced apart from one another;
   a belt pulley pack mounted on each of the shafts, each belt pulley pack comprising a plurality of belt pulleys mounted adjacent to one another, wherein each belt pulley comprises a mold-cast object comprising:
      a first side having a first aligning and coupling element formed therein;
      a second side opposite to the first side, the second side having a second aligning and coupling element fitted to match the first aligning and coupling element, so that the first and second aligning and coupling elements of adjacent belt pulleys align and couple the adjacent belt pulleys together in a shape-locking manner; and
   a moving transport surface comprising a plurality of mutually parallel endless belt loops, each of the belt loops passing over two belt pulleys located on different shafts;
   wherein the belt loops comprise toothed belts, and the belt pulleys comprise toothed pulleys having a toothed rim adapted to drivingly engage the toothed belts.

2. The conveyor according to claim 1, wherein the first aligning and coupling element comprises a projection, and the second aligning and coupling element comprises an opening or recess adapted to receive the projection with a close fit.

3. The conveyor according to claim 1, wherein the belt pulleys or the belt pulley packs are non-rotatably fixed to the shaft in a shape-locking manner.

4. The conveyor according to claim 1, wherein at least one of the belt pulley packs comprises:
   a plurality of first belt pulleys having a first diameter and a first number of teeth; and
   a plurality of second belt pulleys having a second diameter and a second number of teeth that are different from the first diameter and the first number of teeth, respectively;
   wherein the first belt pulleys and the second belt pulleys are arranged in alternating order with a first belt pulley located adjacent a second belt pulley.

5. The conveyor according to claim 4, wherein at least one of the belt pulley packs comprises a plurality of belt pulleys, each of which has the same diameter and the same number of teeth.

6. The conveyor according to claim 1, wherein at least one of the belt pulley packs comprises a plurality of belt pulleys, each belt pulley comprising:
   a toothed rim; and
   a guide flange formed integrally on one side of the toothed rim;
   wherein the plurality of belt pulleys are located aside one another such that each toothed rim has a guide flange located on each side of its toothed rim to guide the belt loop on the toothed rim.

7. The conveyor of claim 1, wherein at least one of the belt pulley packs comprises:
   a plurality of belt pulleys, each comprising a toothed rim that is open on both lateral sides; and
   a separate guide flange located between each adjacent pair of belt pulleys to guide the belt loop on the toothed rim.

8. The conveyor of claim 1, wherein at least one of the belt pulley packs comprises:
   a plurality of belt pulleys, each comprising a first toothed rim, a second toothed rim, and a guide flange located between the first and second toothed rims, the first toothed rim, second toothed rim, and the guide flange being of unitary construction; and
   a separate guide flange located between each adjacent pair of belt pulleys to guide the belt loop on the first or second toothed rim.

9. The conveyor of claim 1, further comprising a stopper element located on at least one of the plurality of shafts and adapted to support a first end of a belt pulley pack, and a tightening element located on the at least one shaft and adapted to press against a second end of the belt pulley pack to press the belt pulley pack axially against the stopper element.

10. The conveyor of claim 1, wherein at least one of the belt pulleys comprises an injection molded plastic object.

11. The conveyor of claim 1, wherein at least one of the belt pulleys comprises a metal casting.

* * * * *